H. SIEBEN.
GAS CONTROLLING APPARATUS.
APPLICATION FILED APR. 8, 1910.
Reissued Jan. 3, 1911.
13,193.
2 SHEETS—SHEET 1.
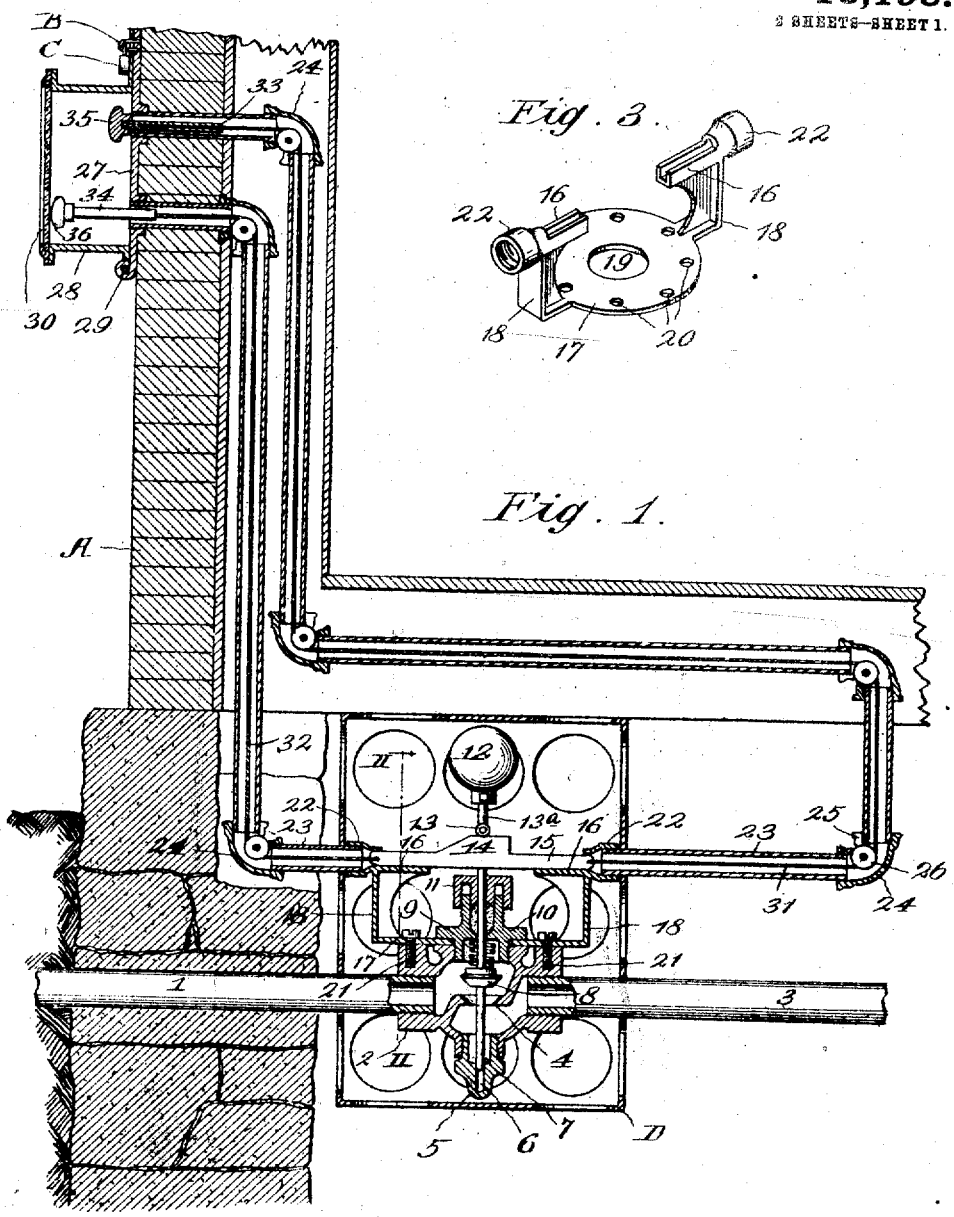
WITNESSES:
R. H. Hamilton.
M. Cox
INVENTOR.
Henry Sieben,
BY F. G. Fischer
ATTORNEY.

H. SIEBEN.

GAS CONTROLLING APPARATUS.

APPLICATION FILED APR. 8, 1910.

Reissued Jan. 3, 1911.

13,193.

2 SHEETS—SHEET 2.

WITNESSES:

R. C. Hamilton

M. Cox.

INVENTOR.

Henry Sieben,

BY F. G. Fischer,

ATTORNEY.

UNITED STATES PATENT OFFICE.

HENRY SIEBEN, OF KANSAS CITY, MISSOURI, ASSIGNOR, BY DIRECT AND MESNE ASSIGNMENTS, TO FIRE AND GAS APPLIANCES COMPANY, OF KANSAS CITY, MISSOURI, A CORPORATION OF MISSOURI.

GAS-CONTROLLING APPARATUS.

13,193. Specification of Reissued Letters Patent. Reissued Jan. 3, 1911.

Original No. 903,794, dated November 10, 1908, Serial No. 412,389. Application for reissue filed April 8, 1910. Serial No. 554,299.

*To all whom it may concern:*

Be it known that I, HENRY SIEBEN, a citizen of the United States, residing at Kansas City, in the county of Jackson and State of Missouri, have invented certain new and useful Improvements in Gas-Controlling Apparatus, of which the following is a specification.

This invention relates to gas-controlling apparatus and my object is to produce apparatus designed for use in connection with buildings to permit the gas-supply therefor to be cut off manually in the event of fire, or which will automatically cut off such supply of gas in the event that it is subjected to a predetermined heat.

Figure 4:
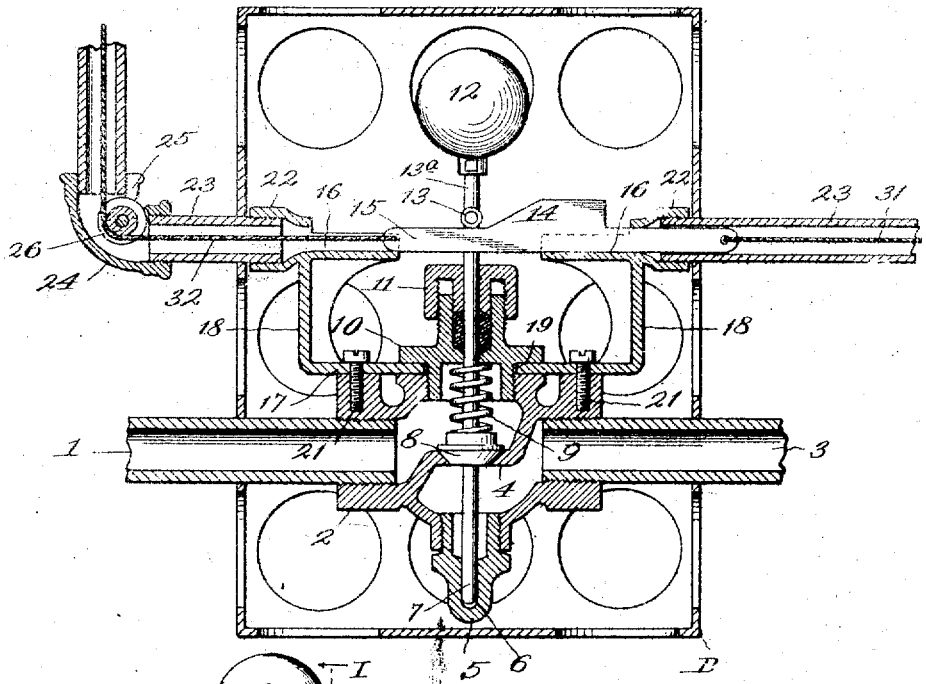
Figure 2:
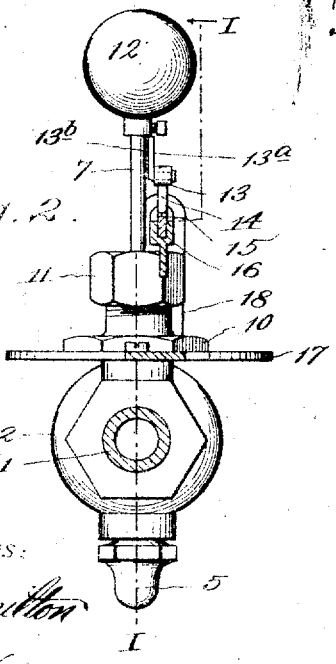
Figure 5:
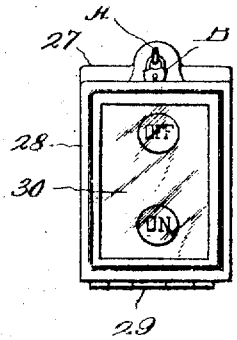

In order that the invention may be fully understood, reference is to be had to the accompanying drawings, in which:

Figure 1 is a sectional view of a part of a building and a part of gas-controlling apparatus embodying my invention, the apparatus being in section on line I—I of Fig. 2. Fig. 2 is a vertical section on line II—II of Fig. 1. Fig. 3 is a detail perspective view of a bracket, forming part of the apparatus. Fig. 4 is an enlarged, vertical sectional view of part of the gas-controlling apparatus. Fig. 5 is a front elevation of a box employed in carrying out the invention.

In said drawings, 1 and 3 designate two joints of pipe constituting a service-pipe leading from a main, not shown, into a building A. The flow of gas or other fluid through said service-pipe is controlled by a valve comprising a casing 2 having a diaphragm or valve-seat 4 with a centrally-located port for the passage of the gas, a cup 5 screwed into the lower end of the casing to normally close the same and provided with a guide-passage 6, a stem 7 extending downward through diaphragm 4 and slidably engaging the walls of the guide-passage 6, a valve-plug 8 secured to stem 7 and adapted to close the port in the diaphragm, a cap 10 screwed into the upper portion of casing 2 and provided with a stuffing-box through which the stem 7 extends, a packing-nut 11 adjustably engaging cap 10, and an expansion spring 9 interposed between cap 10 and the valve-plug 8 and tending to seat the latter in the diaphragm to cut off the supply of gas from pipe 1 to pipe 3.

12 designates a weight secured to the upper end of stem 7 to coöperate with spring 9 in seating the valve-plug 8.

To hold the valve unseated normally, a part or member such as a roller 13 is carried by an angle-bracket $13^a$, secured by a fusible substance $13^b$ (Fig. 2) to the valve-stem 7, said roller resting upon the cam trackway 14 of a reciprocatory bar 15, mounted in guides 16 of a bracket consisting of a base 17 and angle-arms 18 projecting from opposite sides of the base and formed integral with or carrying the guides 16. Base 17 is adapted to rest upon the valve casing 2 and be clamped thereon by cap 10 (Fig. 4) which extends through a central hole 19 in said base and engages the upper portion of the valve casing. Base 17 is provided with a circular series of holes 20 through two of which a pair of machine-screws 21 extend down into the valve casing to prevent the bracket from turning upon said casing, it being apparent that by the provision of a plurality of holes 20 the bracket can be swiveled in different directions and so secured by the same pair of machine-screws 21. The guides 16 terminate in annular heads 22 to receive the ends of a pair of conduits preferably consisting of tubes 23 connected by elbows 24, and leading to any desired point of the building. The elbows on their inner sides are slotted as at 25 to conveniently receive guide-rollers 26, the parts being so proportioned that the cables, hereinafter referred to, cannot be disengaged from said rollers. As shown the upper ends of the conduits opposite to the annular heads 22, extend through the wall of the building contiguous to which the valve is arranged.

A box or other suitable receptacle receives the upper ends of the conduits and by preference consists of a back 27 and a body portion 28. The latter is hinged by preference to the back at 29, and is adapted to be locked to prevent any but an authorized person from gaining access to the interior of the box, a staple B projecting from back 27 through a slot in the body portion 28 and engaged by a pad-lock C being one convenient means for locking said box. The face-plate 30 of the box is glass or other frangible material, so that anyone unable to open the box in the proper manner may obtain access to the interior thereof by breaking the face-plate 30, it being understood in this connection that the box may be located either in a hallway of the building, or upon the outer wall of the building as shown, where it can be readily discovered and the supply of gas to the building be quickly cut off in case of fire.

31 and 32 designate the cables above referred to, which extend through the conduits and run over the rollers 26 to prevent friction between said cables and the elbows 24. Said cables 31 and 32 are attached at their lower ends to opposite ends of the reciprocatory bar 15 and attached at their upper ends to tubes 33 and 34, respectively, slidably-mounted in the upper ends of the conduits and provided, respectively, with handles 35 and 36, extending into the box. By thus securing the cables 31 and 32 to the tubes 33 and 34, respectively, they never become exposed in the box when the handles are pulled forward, and consequently cannot sag from the front ends of the conduits and thus interfere with the quick and free operation of the reciprocatory bar 15.

When the reciprocatory bar 15 is in the position shown in Fig. 1, handle 36 is drawn forward and handle 35 is backward in contact with the contiguous end of its respective conduit. Should the building take fire, and the latter gain considerable headway before it was discovered, and the heat rise to a predetermined degree, the substance $13^b$ between the valve-stem and the angle-bracket $13^a$, would fuse and as a result the valve would automatically close and cut off the supply of gas to the building.

Should the house occupant discover the fire before the heat was sufficient to fuse the substance $13^b$, he could open the box, grasp and pull forward handle 35 and by so doing slide the reciprocatory bar 15 to the right and permit the valve to close, as shown in Fig. 4. Should the occupant fail to operate the reciprocatory bar, any other person, such for instance as a fireman, could break the face-plate 30 of the box and then grasp the handle 35 and pull the same forward, it being understood when this operation occurs the handle 36 is drawn rearward. To reset the valve in the event that the bracket $13^a$ remains fastened to the valve-stem 7, handle 36 is drawn forward to restore the reciprocatory bar 15 to its initial position and cause its cam-trackway 14 to engage and lift the roller 13, together with the valve stem, to their original positions shown in Fig. 1.

By the arrangement above described, it will be understood that the cords or cables are fully protected from accidental or intentional injury, as access cannot be had to break or cut them. As a further precautionary measure the valve mechanism and the reciprocatory bar are contained within a perforated casing D, which will admit sufficient heat or flame to fuse the substance $13^b$ between the valve-stem and the bracket $13^a$, and yet prevent said parts from being tampered with. Said casing, furthermore, serves to catch the bracket $13^a$ should it become detached and thus avoids the chance of the same being lost, as the same bracket can be secured in position after being detached.

From the above description it will be apparent that I have produced gas-controlling apparatus embodying the features of advantage enumerated, but I wish it understood that I do not desire to be restricted to the exact details of construction shown and described, as various modifications will suggest themselves to one skilled in the art.

Having thus described my invention what I claim is:—

1. In an apparatus of the character described, a service-pipe for conducting gas into a building, a self-closing valve to control the flow of gas through said pipe, manually-operable means to normally hold said valve in open position leading to the exterior of the building, and a box inclosing the free end of said manually-operable means.

2. In an apparatus of the character described, a service-pipe for conducting fluid into a building, a self-closing valve to control the flow of fluid through said pipe, flexible means to normally hold said valve in open position, a conduit through which said flexible means extends, a member slidably-arranged in the conduit and to which the free end of said flexible means is attached, and a handle on said member.

3. In an apparatus of the character described, a service-pipe for conducting fluid into a building, a self-closing valve to control the flow of fluid through said pipe, flexible means to restore the valve to open position after the same has closed, and a conduit through which said flexible means extends.

4. In an apparatus of the character described, a service-pipe for conducting fluid into a building, a self-closing valve to control the flow of fluid through said pipe, a member to normally hold said valve in open position, and manually-operable means to move said member to an inoperative position to allow the valve to close.

5. In an apparatus of the character described, a service-pipe for conducting fluid into a building, a self-closing valve to control the flow of fluid through said pipe, a member to normally hold said valve in open position, manually-operable means to move said member to an inoperative position to allow the valve to close, and means to restore said member to an operative position to open the valve.

6. In an apparatus of the character described, a pair of pipes, a valve, means tending to cause the valve to close communication between the pipes, a part fusibly-connected with the valve, a member engaging said part and normally holding said valve unseated, and a suitably-guided flexible connection attached to said member to actuate the same and permit the valve to be seated.

7. In an apparatus of the character described, a pair of pipes, a valve, means tending to cause the valve to close communication between the pipes, a member to normally hold the valve unseated, and suitably-guided flexible connections attached to opposite ends of said member to move the same in one direction to permit the valve to close, or in the opposite direction to open said valve.

8. In an apparatus of the character described, a pair of pipes, a valve, means tending to cause the valve to close communication between the pipes, a member to normally hold the valve unseated, suitably-guided flexible connections attached to opposite ends of said member to move the same in one direction to permit the valve to close, or in the opposite direction to open said valve, and a box to protect the free ends of said flexible connections.

9. In an apparatus of the character described, a pair of pipes, a self-closing valve to control communication between said pipes, a cam-bar for normally holding said valve open, and manually-operable means for moving said cam-bar in one direction to allow the valve to close, and a conduit through which said means extends.

10. In an apparatus of the character described, a pair of pipes, a self-closing valve to control communication between said pipes, a cam-bar for normally holding said valve open, and suitably-guided flexible connections attached to opposite ends of said cam-bar to move the same in one direction to permit the valve to close or in the opposite direction to open said valve.

11. In an apparatus of the character described, a pair of pipes, a self-closing valve to control communication between said pipes, a member to normally hold the valve open, a flexible connection attached to said member to actuate the same to allow the valve to close, and a conduit to protect said connection.

12. In an apparatus of the character described, a pair of pipes, a self-closing valve to control communication between said pipes, a member to hold the valve unseated, a box, and suitably-guided connections extending into said box at one end and attached at their opposite ends to the opposite ends of said member to move the same in one direction to permit the valve to close or in the opposite direction to permit said valve to open.

13. In an apparatus of the character described, a service-pipe, a self-closing valve to control the flow of fluid through said service-pipe, a guide adjacent said valve, a member operably engaging said guide and normally holding the valve in open position, and manually-operable means for actuating said member to allow the valve to close, and a box inclosing one end of said means.

14. In an apparatus of the character described, a service-pipe, a self-closing valve to control the flow of fluid through said service-pipe, a guide adjustably-mounted adjacent to said valve, a member slidably-engaging said guide and normally holding the valve in open position, and a flexible connection attached to said member to actuate the same and allow the valve to close.

15. In an apparatus of the character described, a pair of pipes, a valve, means tending to cause the valve to close communication between the pipes, alined guides rotatably-adjustable with respect to the valve, a member operably-engaging said guides and normally holding the valve in open position, means to move said member in one direction to allow the valve to close, and means to move said member in the opposite direction to open the valve.

16. In an apparatus of the character described, a service-pipe, a self-closing valve to control the flow of fluid through said service-pipe, a guide adjacent said valve, a member operably engaging said guide and normally holding the valve in open position, means for actuating said member to allow the valve to close, and a perforated casing inclosing the valve and parts adjacent thereto.

17. In an apparatus of the character described, a pair of pipes, a valve, yielding means tending to cause the valve to close communication between the pipes, a part fusibly connected with the valve, a cam-bar engaging said part and normally holding said valve unseated, a box, and suitably-guided flexible connections projecting into said box at one end and attached at their opposite ends to opposite ends of said cam-bar to move the same in one direction to permit the valve to be seated or in the opposite direction to raise said part and therefore the valve from its seat.

18. In an apparatus of the character described, a pair of pipes, a valve, yielding means tending to cause the valve to close communication between the pipes, a part fusibly connected with the valve, a cam-bar engaging said part and normally holding said valve unseated, a box, flexible connections projecting into said box at one end and attached at their opposite ends to opposite ends of said cam-bar to move the same in one direction to permit the valve to be seated or in the opposite direction to raise said part and therefore the valve from its seat, tortuous conduits inclosing and protecting said flexible connections for their full length, and grooved guide sheaves in said conduits at their bending points, to form guides for the said flexible connections.

19. In an apparatus of the character described, a pair of pipes, a valve, yielding means tending to cause the valve to close communication between the pipes, a part movable with the valve, a bracket rotatably adjustable with respect to the valve and provided with alined guides, a cam-bar engaging said guides and the part movable with the valve and normally holding the valve unseated, and suitably-guided flexible connections attached to opposite ends of the cam-bar and provided with handles.

20. In an apparatus of the character described, a pair of pipes, a valve, yielding means tending to cause the valve to close communication between the pipes, a part movable with the valve, a bracket rotatably adjustable with respect to the valve and provided with alined guides, a cam-bar engaging said guides and the part movable with the valve and normally holding the valve unseated, suitably-guided flexible connections attached to opposite ends of the cam-bar and provided with handles, and a perforated casing inclosing the valve, the bracket, and the cam-bar.

In testimony whereof I affix my signature in the presence of two witnesses.

HENRY SIEBEN.

Witnesses:
F. G. FISCHER,
M. COX.